(12) United States Patent
Marchione

(10) Patent No.: US 12,472,580 B2
(45) Date of Patent: Nov. 18, 2025

(54) LASER HANDHELD TRIMMING AND WELDING DEVICE

(71) Applicant: Caterpillar Inc., Peoria, IL (US)

(72) Inventor: Thierry Andre Marchione, Heber City, UT (US)

(73) Assignee: Caterpillar Inc., Peoria, IL (US)

( * ) Notice: Subject to any disclaimer, the term of this patent is extended or adjusted under 35 U.S.C. 154(b) by 773 days.

(21) Appl. No.: 17/829,487

(22) Filed: Jun. 1, 2022

(65) Prior Publication Data

US 2023/0390862 A1    Dec. 7, 2023

(51) Int. Cl.
  *B23K 26/00*  (2014.01)
  *B23K 26/14*  (2014.01)
  *B23K 26/21*  (2014.01)
  *B23K 26/361* (2014.01)
  *B23K 26/70*  (2014.01)

(52) U.S. Cl.
  CPC ...... *B23K 26/0096* (2013.01); *B23K 26/1462* (2015.10); *B23K 26/21* (2015.10); *B23K 26/361* (2015.10); *B23K 26/702* (2015.10)

(58) Field of Classification Search
  CPC .... B23K 26/702; B23K 26/361; B23K 26/21; B23K 26/1462; B23K 26/0096
  USPC .................................................. 219/121.63
  See application file for complete search history.

(56) References Cited

U.S. PATENT DOCUMENTS

| | | | | |
|---|---|---|---|---|
| 4,564,736 A | * | 1/1986 | Jones ..................... | B23K 26/06 385/127 |
| 4,724,299 A | * | 2/1988 | Hammeke ............. | B23K 26/144 219/121.84 |
| 4,804,815 A | * | 2/1989 | Everett ................... | B05B 7/228 219/121.84 |
| 4,814,575 A | * | 3/1989 | Petitbon ................. | C23C 4/12 219/121.84 |
| 4,859,826 A | * | 8/1989 | Hess, III ............. | B23K 26/1436 219/121.84 |
| 5,142,118 A | * | 8/1992 | Schlatter ............... | B23K 26/037 219/121.63 |

(Continued)

FOREIGN PATENT DOCUMENTS

| | | | | |
|---|---|---|---|---|
| CN | 101176949 A | * | 5/2008 | ............. B23K 26/00 |
| CN | 107755881 A | * | 3/2018 | ........... B23K 26/034 |

(Continued)

OTHER PUBLICATIONS

Ruderman Michael: "Minimal-model for robust control design of large-scale hydraulic machines", 2018 IEEE 15th International Workshop on Advanced Motion Control (AMC), IEEE, Mar. 9, 2018 (Mar. 9, 2018), pp. 1-5, XP033353130, DOI: 10.1109/AMC. 2019.8371125 [retrieved on Jun. 1, 2018].

(Continued)

*Primary Examiner* — Jimmy Chou

(57) ABSTRACT

A handheld laser trimming and welding device can include a handheld laser trimming and welding wand and a nozzle. The nozzle can extend from the handheld laser trimming and welding wand to a distal portion, and the nozzle can have an aperture on the distal portion. The distal portion of the nozzle can be configured to optically communicate a laser to the distal portion of the nozzle and fluidically communicate a pressurized gas to the distal portion of the nozzle.

15 Claims, 9 Drawing Sheets

(56) References Cited

U.S. PATENT DOCUMENTS

| | | | | |
|---|---|---|---|---|
| 6,335,507 B1* | 1/2002 | Nakata | ............... | B23K 26/1482 |
| | | | | 219/121.84 |
| 6,593,540 B1* | 7/2003 | Baker | ................... | B23K 35/38 |
| | | | | 219/121.63 |
| 6,965,091 B2* | 11/2005 | Terada | ................. | B23K 26/037 |
| | | | | 219/121.65 |
| 7,763,826 B2* | 7/2010 | Chen | .................. | B23K 26/1435 |
| | | | | 219/121.72 |
| 7,855,350 B2* | 12/2010 | Schurmann | ............ | B23K 26/03 |
| | | | | 219/121.64 |
| 9,006,605 B2* | 4/2015 | Schneegans | ......... | B21D 39/021 |
| | | | | 219/121.63 |
| 10,293,432 B2* | 5/2019 | Fomin | ................... | B23K 26/24 |
| 2002/0079295 A1* | 6/2002 | Shikoda | ............... | B23K 26/244 |
| | | | | 219/121.78 |
| 2004/0251243 A1* | 12/2004 | Lizotte | ............... | B23K 26/0676 |
| | | | | 219/121.73 |
| 2007/0012668 A1* | 1/2007 | Kubo | ................ | B23K 26/1488 |
| | | | | 219/121.84 |
| 2007/0221637 A1* | 9/2007 | Schurmann | ............ | B23K 26/03 |
| | | | | 219/121.64 |
| 2008/0217312 A1* | 9/2008 | Tokura | ................ | B81C 1/00896 |
| | | | | 219/121.72 |
| 2013/0126492 A1* | 5/2013 | Mori | ...................... | B23K 26/00 |
| | | | | 219/121.83 |
| 2015/0290736 A1* | 10/2015 | Zhang | ................ | B23K 26/1476 |
| | | | | 219/56.22 |
| 2017/0092021 A1 | 3/2017 | Nielsen et al. | | |

FOREIGN PATENT DOCUMENTS

| | | | | |
|---|---|---|---|---|
| CN | 213827555 | | 7/2021 | |
| EP | 1219384 A2 * | | 7/2002 | ........... B23K 26/037 |
| EP | 1674191 | | 5/2007 | |
| EP | 3876057 A1 | | 9/2021 | |
| JP | H11245063 | | 9/1999 | |
| JP | 4574977 | | 8/2010 | |
| JP | 2020166745 A | | 10/2020 | |
| KR | 101310600 | | 9/2013 | |

OTHER PUBLICATIONS

Written Opinion and International Search Report for Int'l. Patent Appln. No. PCT/US2022/050022, mailed Mar. 28, 2023 (12 pgs).

* cited by examiner

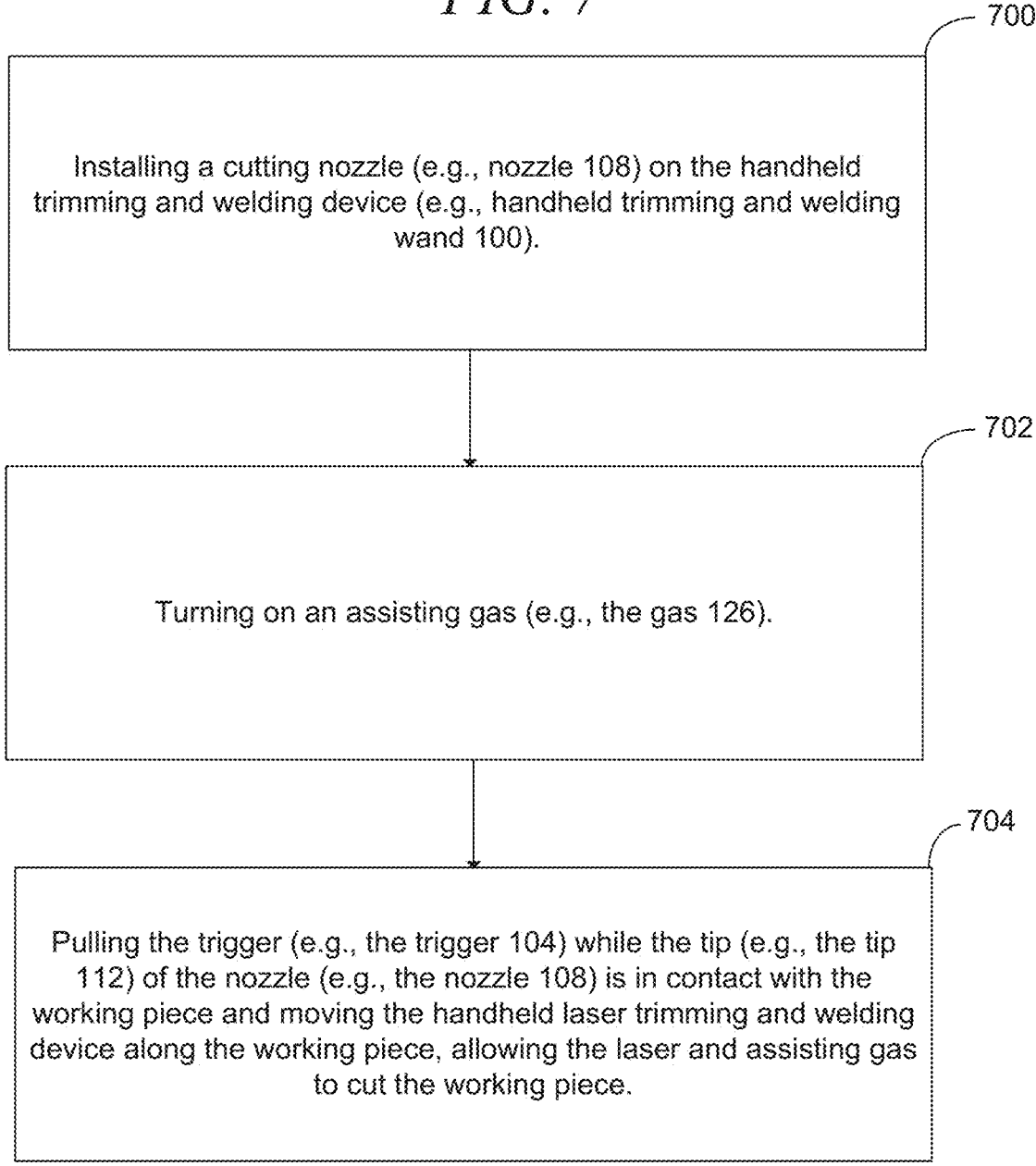

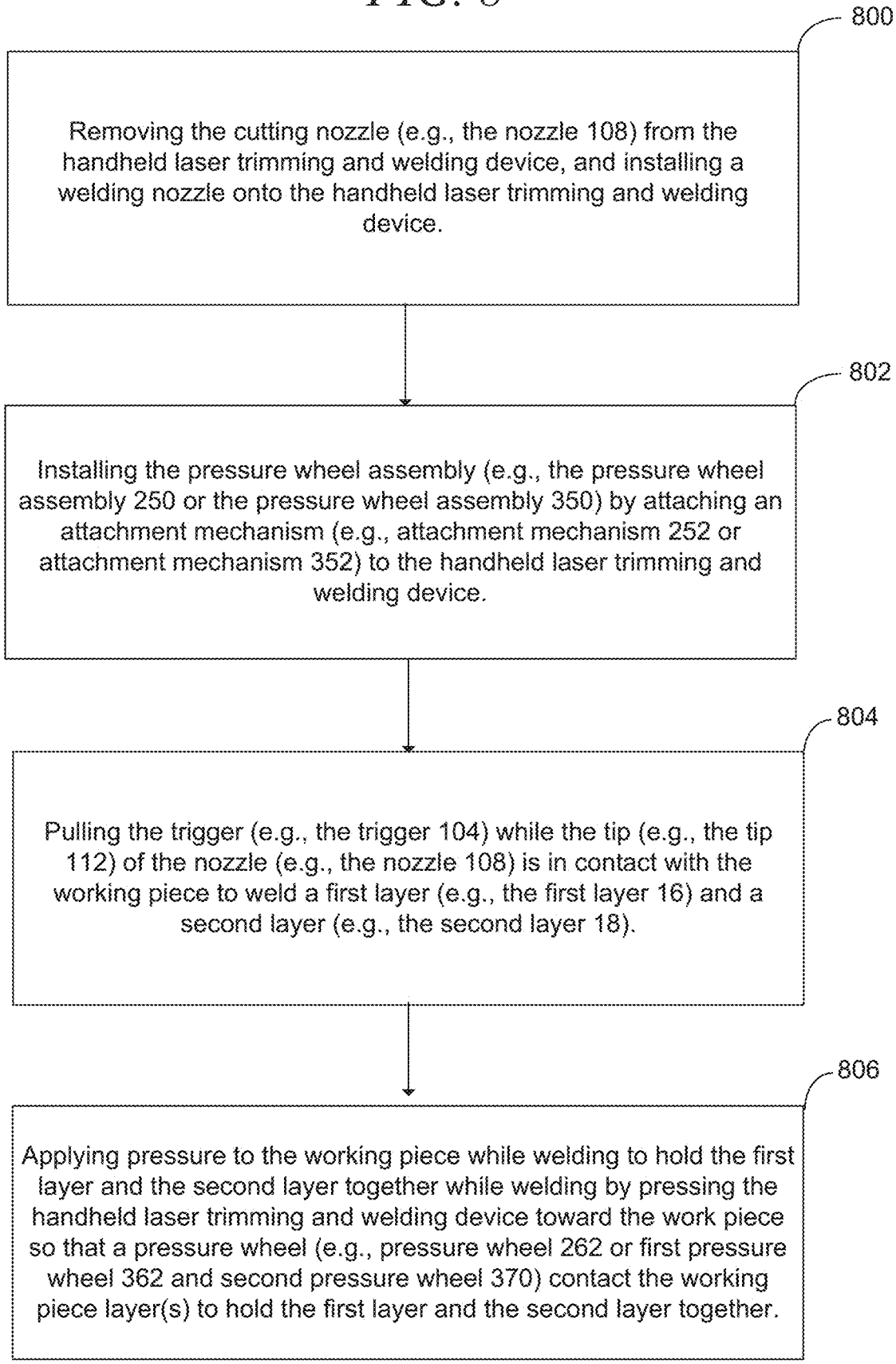

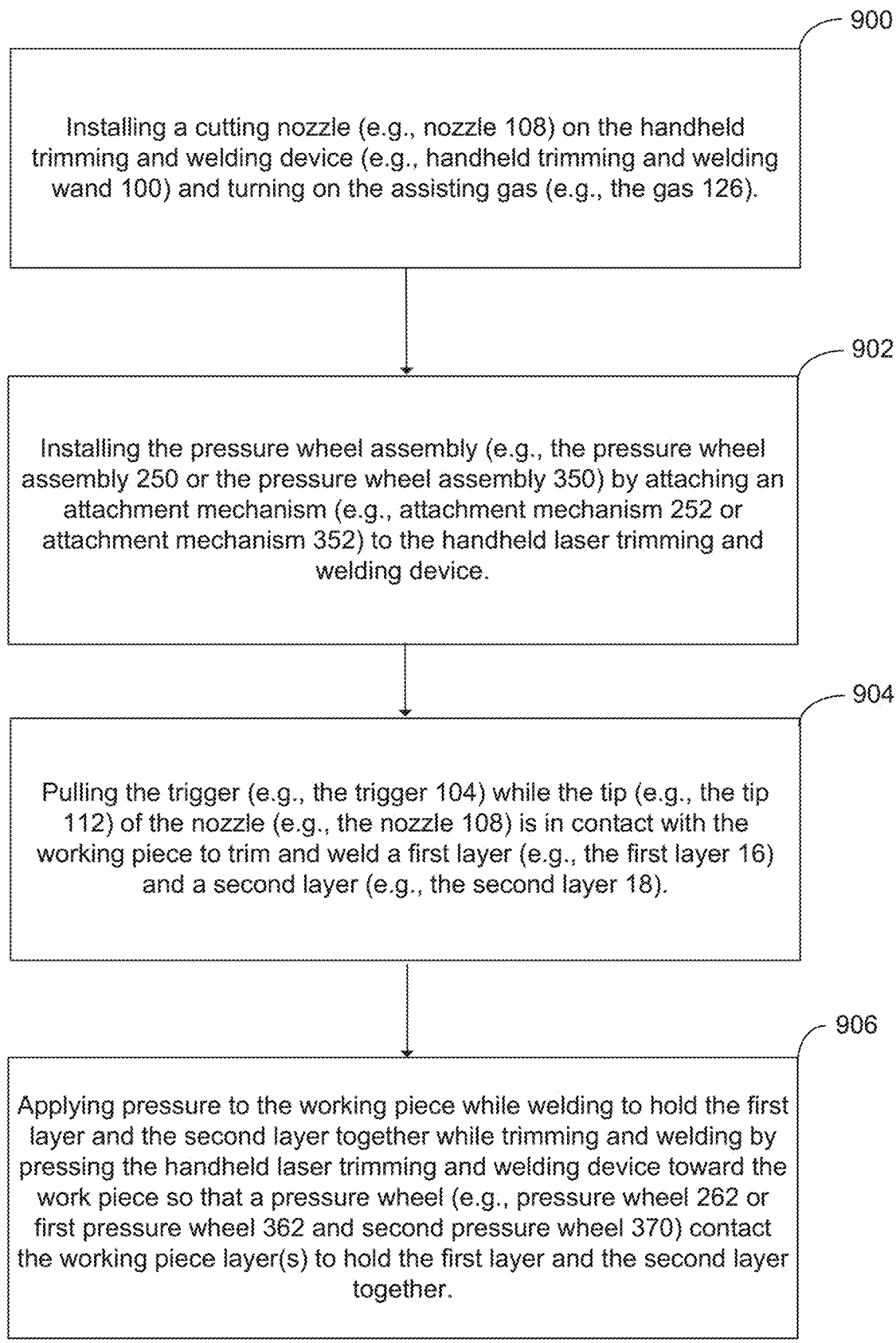

LASER HANDHELD TRIMMING AND WELDING DEVICE

TECHNICAL FIELD

The present disclosure relates to tools and systems for connecting or cutting pieces of material such as by heat to as weld, fuse, or cut. More particularly, the present disclosure relates to a handheld tool such as a handheld laser. Still more particularly, the present disclosure relates to a handheld tool for laser welding and/or laser cutting of heat shield material or other relatively delicate materials.

BACKGROUND

Engines can be used in many applications that can be simplified by leveraging engines' mechanical advantage. As engines operate, engines can turn potential energy (e.g., gasoline, diesel fuel, stored electricity, pneumatics, or hydraulics) into kinetic energy (e.g., rotation of a cam or shaft, translation of a mechanical interface, or an actuator). Engines can generate heat that dissipates through an exhaust system, a header, or an engine block.

The heat generated from engines can interfere with other components around the engine or can create an environment that is too hot for the operator of the engine. Therefore, heat shields can be installed to prevent heat dissipation in areas around the machine. Heat shields can be formed from relatively thin and/or delicate sheets of metal and can have a variety of shapes and sizes. Working with the thin metal or other heat shield material to cut and form the wide variety of shapes and sizes can be time-consuming and painstaking.

U.S. Pat. No. 4,859,826 to Hess, assigned to Laser Applications, Inc., and issued on Aug. 22, 1989, discloses a method of trimming and welding metal, especially relatively thin sheets of metal, utilizing laser energy. The method uses surface tension in the globule created at the site of the impingement of the laser beam on the work to form finished edges on both sides of the line of cut. A laser beam surrounded by a thin shield of inert gas is used, the gas removing some of the molten metal but leaving sufficient to form the beads which comprise the finished edges on both sides of the cut, and also preventing oxidation of the beads.

SUMMARY OF THE INVENTION

In one example, a handheld laser trimming and welding device can include a laser welding wand and a nozzle. The nozzle can extend from the laser welding wand to a distal portion, and the nozzle can have an aperture on the distal portion. The distal portion of the nozzle can be configured to optically communicate a laser to the distal portion of the nozzle and fluidically communicate a pressurized gas to the distal portion of the nozzle.

In another example, a handheld laser trimming and welding device can include a laser welding wand, a nozzle, and a pressure wheel. The nozzle can extend from the laser welding wand to a distal portion, and the pressure wheel can be attached to the laser welding wand. The pressure wheel can be configured to apply pressure to a working sheet while the handheld laser trimming and welding device welds the working sheet.

In another example, a handheld laser trimming and welding device can include a laser welding wand, a nozzle, and a pressure wheel. The nozzle can extend from the laser welding wand to a distal portion, and the nozzle can have an aperture on the distal portion. The distal portion of the nozzle can be configured to optically communicate a laser to the distal portion of the nozzle and fluidically communicate a pressurized gas to the distal portion of the nozzle. The pressure wheel can be attached to the laser welding wand. The pressure wheel can be configured to apply pressure to a working sheet while the handheld laser trimming and welding device welds the working sheet.

BRIEF DESCRIPTION OF THE DRAWINGS

In the drawings, which are not necessarily drawn to scale, like numerals may describe similar components in different views. Like numerals having different letter suffixes may represent different instances of similar components. The drawings generally illustrate various embodiments discussed in the present document by way of example, but not by way of limitation.

FIG. 7 is a flowchart showing the steps of preparing and using a laser welding wand to trim a working material.

FIG. 8 is a flowchart showing the steps of preparing and using a laser welding wand to weld a working material.

FIG. 9 is a flowchart showing the steps of preparing and using a laser welding wand to trim and weld a working material.

DETAILED DESCRIPTION

Figure 1:
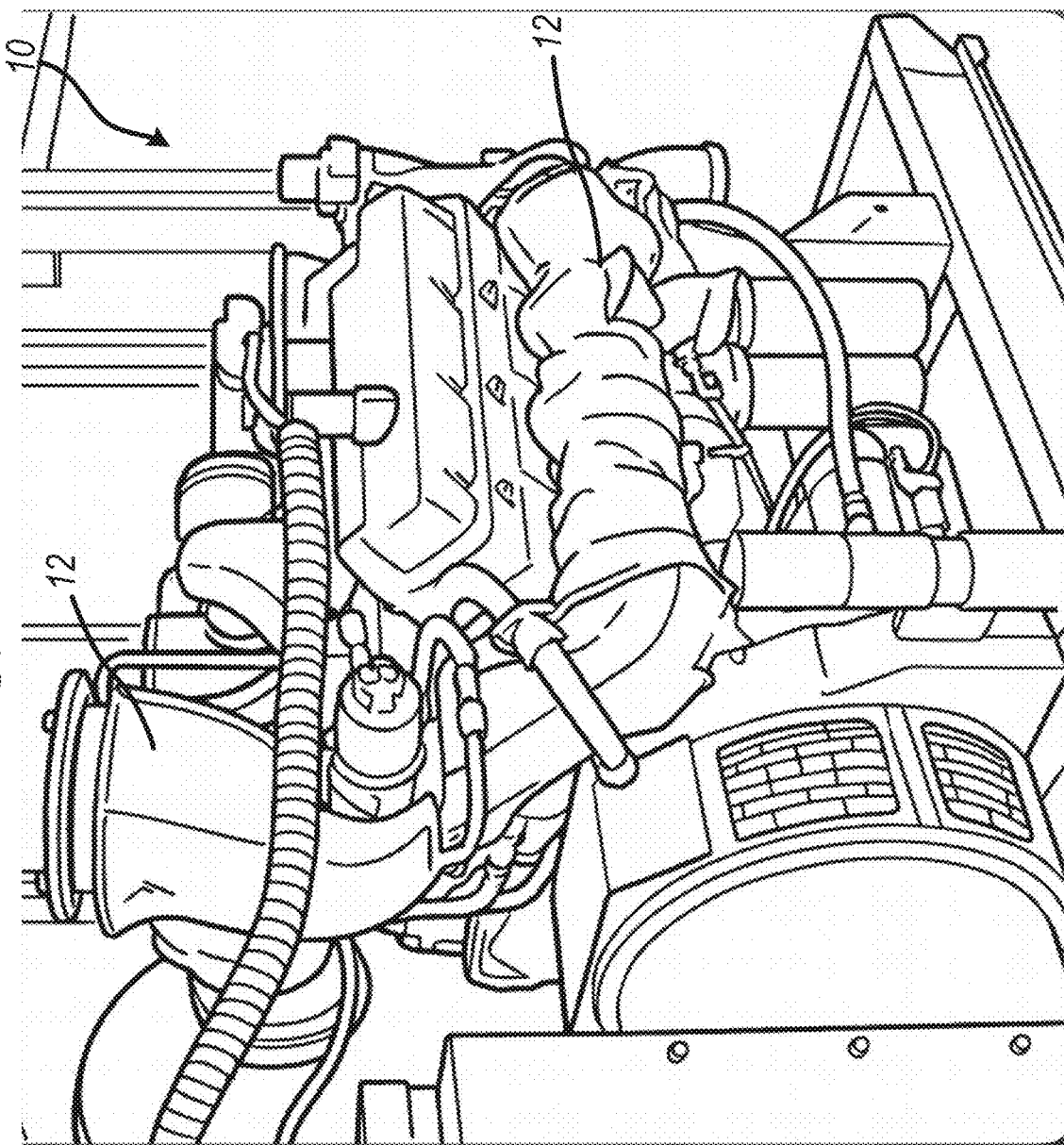
FIG. 1 is a perspective view of a portion of an engine.

FIG. 1 is a perspective view of a portion of an engine 10. The example shown in FIG. 1 shows that the engine 10 can be a Caterpillar 3408 engine. In another example, the engine 10 can be any other engine that can be configured to convert potential energy (e.g., gasoline, diesel fuel, stored electricity, pneumatics, or hydraulics) into kinetic energy (e.g., rotation of a cam or shaft or translation of a mechanical interface or an actuator).

The engine 10 can include a heat shield 12. The heat shield 12 can be configured to retain heat within the engine 10 and decrease the heat released from the engine 10. As shown in FIG. 1, the heat shield 12 can be configured to surround a system of the engine 10 having complex geometry. For example, the heat shield 12 can be manufactured to cover a complex header, exhaust system, or any other portion of the engine 10. Because the heat shield 12 must follow complex geometries, the manufacturing of the heat shield 12 can require precise trimming and welding of multiple layers of insulating materials. Therefore, the manufacturing of the heat shield 10 can be laborious and expensive.

Figure 2:
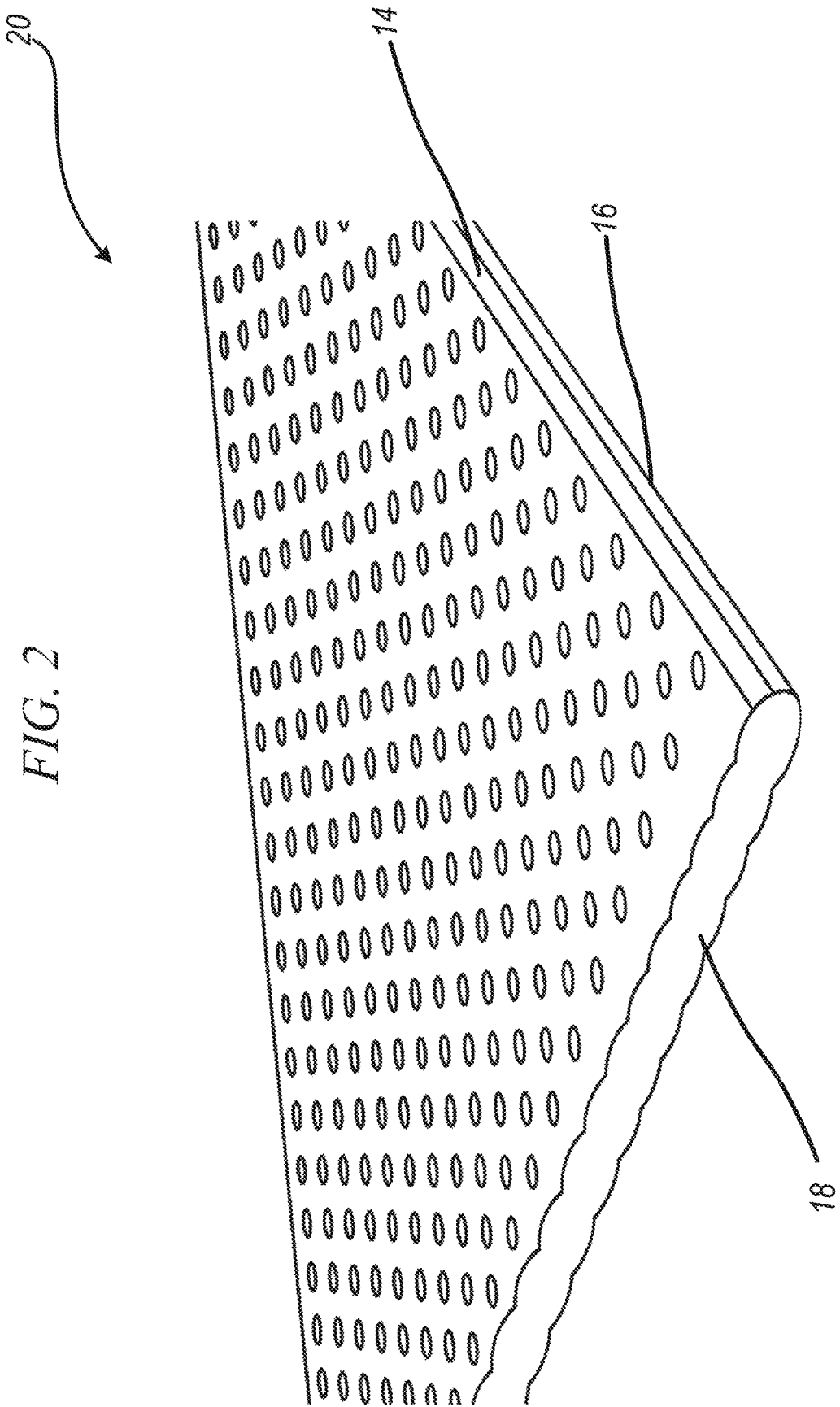
FIG. 2 is a perspective view of a portion of a heat shield.

FIG. 2 is a perspective view of a portion of a working piece 20 after it has been trimmed and welded. As discussed above, the heat shield 12 may be manufactured to surround a complex header, exhaust system, or any other portion of the engine 10. The working piece 20 can be fabricated to form the heat shield 12. The working piece 20 can include a first layer 14 and a second layer 16. A welding joint 18 can attach the first layer 14 and the second layer 16 while forming the heat shield 12 from the working piece 20. The welding joint 18 can combine the first layer 14 and the second layer 16. The welding joint 18 can combine the first layer 14, the second layer 16, and at least one additional material (not shown).

The first layer 14 and the second layer 16 can be made from aluminum, copper, steel, chromium, or any alloys thereof, or any other material (e.g., polymers, composites, or foams) that can withstand the heat of the engine 10 and can be formed into a foil configured to surround a portion of the engine 10 to help retain heat within the engine 10. The amount of insulation (e.g., R rating or other insulative measure) provided by the heat shield 12 can be altered by the configurations of the first layer 14 and the second layer 16. For example, as shown in FIG. 1, the first layer 14 can have dimples. Similarly, the second layer 16 can have dimples. The dimples of the first layer 14 and the second layer 16 can increase air entrapped between the first layer 14 and the second layer 16. The increase in air entrapped between the first layer 14 and the second layer 16 can improve the amount of insulation provided by the heat shield 12. In another example, the first layer 14 and the second layer 16 can be corrugated or any other shape that can be used to increase air entrapped between the first layer 14 and the second layer 16. Moreover, an additional insulative material (e.g., fibrous insulation or foam insulation) can be added between first layer 14 and second layer 16.

The second layer 16 can be made from aluminum, copper, steel, chromium, or any alloys thereof, or any other material (e.g., polymers, composites, or foams) that can withstand the heat of the engine 10 and that can be formed into a foil configured to surround a portion of the engine 10 to help retain heat within the engine 10. In one example, the first layer 14 and the second layer 16 can be made from the same materials. In another example, the first layer 14 and the second layer 16 can be made from different materials. In yet another example, the first layer 14 can have dimples, corrugation, or any other surface shaping to increase air entrapment between the first layer 14, and the second layer 16 can be flat. Alternatively, the first layer 14 can be flat and the second layer 16 can have dimples, corrugation, or any other surface shaping to increase air entrapment between the first layer 14 and the second layer 16.

The alignment of the first layer 14 and the second layer 16 can influence the amount of insulation provided by the heat shield 12. For example, the dimples of the first layer 14 and the dimples of the second layer 16 can be aligned to entrap more air between the first layer 14 and the second layer 16. In another example, the dimples of the first layer 14 and the dimples of the second layer 16 can be misaligned to nest the first layer 14 and the second layer 16 to entrap less air between the first layer 14 and the second layer 16.

Presently, the heat shield 12 can be manufactured by trimming each layer to size and spot welding each layer together with a stationary spot welder. This method makes it expensive to manufacture the heat shield 12. For example, because of the geometry of engines components and the complexities of the layers (e.g., the first layer 14 and the second layer 16) used to manufacture the heat shield 12, it takes a long time to manufacture the heat shield 12. Further, machine constraints (e.g., a distance between a frame of a spot-welding device and the location of the welding head on the stationary spot-welding device) limit the shapes and sizes that can be easily formed, or, more specifically, can limit the distance from an edge of the material where a weld can be placed. Additionally, making the heat shield 12 with the stationary spot-welding device (e.g., manipulating a workpiece around a stationary spot-welding device) can make manufacturing the heat shield 12 very difficult.

Because making the heat shield 12 can be a laborious operation, it can be difficult to mass-produce the heat shield 12 in a consistent, high-quality manner. The present application describes a handheld laser trimming and welding device that is not limited by its own physical constraints and can be configured to trim and weld at least two layers of material together to form the heat shield 12. The spatial freedom or free movability of the handheld device allows for more easily creating intricate shapes and for welding further from the edge of the material, for example.

Handheld laser welders can be used to weld two materials together. Handheld laser welders can include a control unit, an umbilical cord, and a handheld wand. Handheld laser welders can be adapted to a wide variety of materials and thicknesses. For example, handheld laser welders can be used to weld metals, porcelain, glass, and other materials that a molten pool can be created with heat. Handheld laser welders can use traditional welding techniques (e.g., MIG, TIG) to weld various materials. In some examples, handheld laser welds can weld dissimilar materials.

The welding control unit can be configured to power and control welding parameters (e.g., laser power, welding speed, shielding gas flow, pulse rate, focal distance, and gap). The welding control unit can include a human-machine interface (not shown) that can adjust various welding parameters. The welding control unit can be configured to plug into an outlet or to be energized by electricity. The welding control unit can also be configured to connect with a gas source that can provide a shielding gas to assist in the welding of materials.

The umbilical cord can extend between the control unit and the handheld wand. The umbilical cord can be configured to electrically, fluidically, and optically connect the wand and the control unit. The umbilical cord can be flexible to enable a user mobility while operating the handheld laser welder. The umbilical cord can electronically, optically, and fluidically connect the handheld wand (e.g., a handheld laser trimming and welding wand 100 (shown in FIG. 3). and the welding control unit. For example, the umbilical cord may include electrical power lines, a fiber optic cable, and/or fluid tube or lumen extending along its length.

Figure 3:
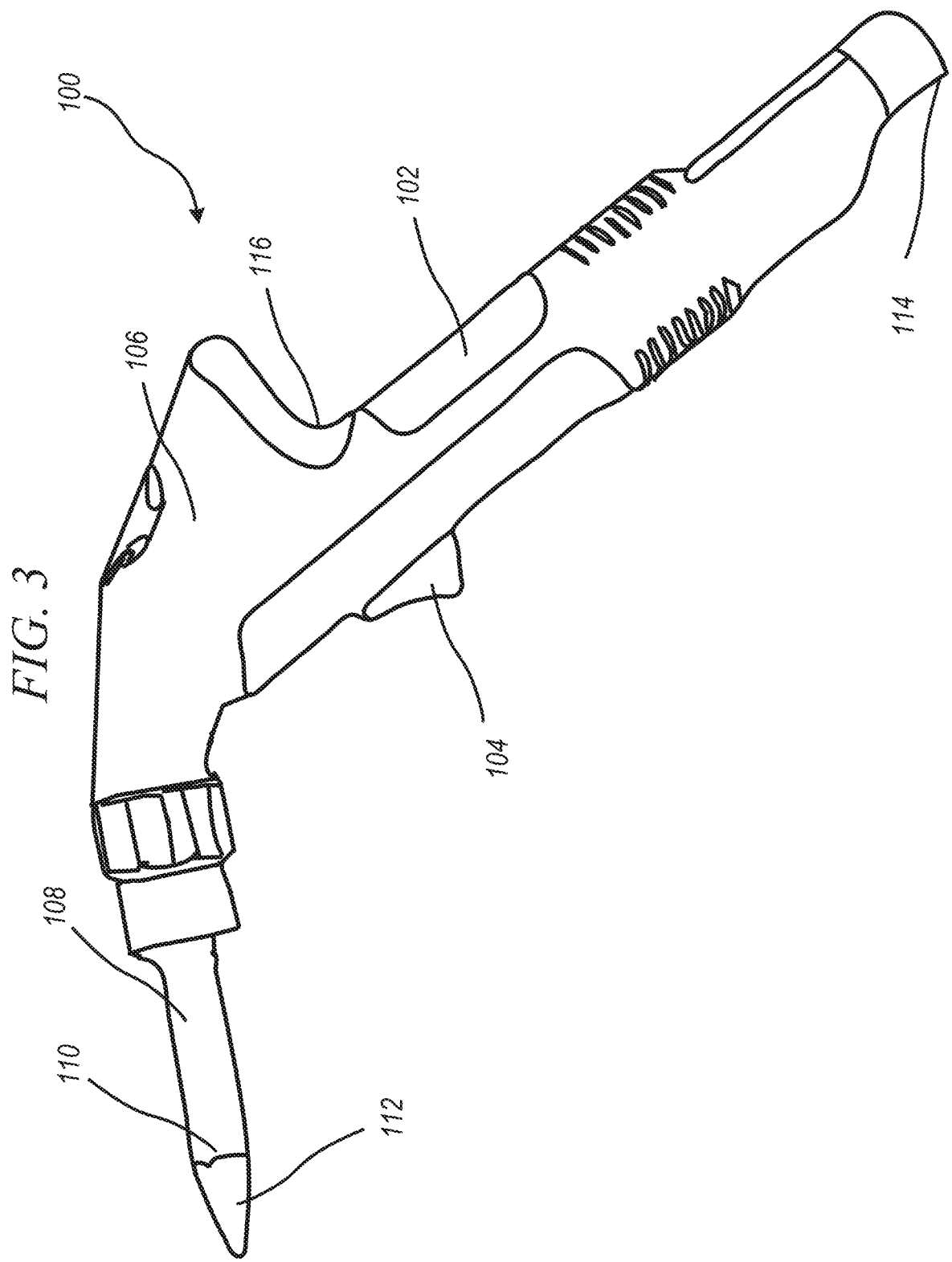
FIG. 3 is a perspective view of a laser welding wand.

FIG. 3 is a perspective view of the handheld laser trimming and welding wand 100. The handheld laser trimming and welding wand 100 can be configured to trim the first layer 14 and the second layer 16. In one or more examples, the handheld laser trimming and welding wand 100 may be configured to trim the first layer 14 (FIG. 2) and the second layer 16 (FIG. 2) while simultaneously joining the first layer 14 and the second layer 16 by creating the weld 18. The handheld laser trimming and welding wand 100 can include a handle 102, a body 106, and a nozzle 108.

The handle 102 can be configured to fit within a person's hand. The handle 102 can be an elongated body extending from a first end 114 to a second end 116. The handle 102 can include ergonomic contours to better fit within a human hand. The handle can be made from plastic or any composite material with low electrical conductivity.

The handle 102 can include a trigger 104. The trigger 104 can be compressed to turn the welder on and released to turn the welder off. The trigger 104 can be a lever, push button, touch sensor, or any other device that can be used to turn the welder on and off. The trigger 104 can include a bias to an off position so that the welder is off when the handheld laser trimming and welding wand 100 is not being held.

The body 106 can extend from the second end 116 of the handle 102. The body 106 can help stabilize the handheld laser trimming and welding wand 100 within the human hand. For example, as shown in FIG. 3, the body 106 can extend from the second end 116 of the handle 102 in a direction that is almost perpendicular to an axial axis of the handle 102. The perpendicular extension of the body 106 can help the handheld laser trimming and welding wand 100 balance within the human hand, such that the perpendicular portion can rest on the thenar webspace (i.e., the area of skin between the thumb and the index finger). The body 106 can be configured to electronically and fluidically connect the handle 102 of the handheld laser trimming and welding wand 100 to the nozzle 108.

In one example, the body 106 can include a laser generator (not shown) configured to generate a laser used to weld the working piece 20. In another example, the laser generator can be located within the welding control unit and the laser can be optically communicated through the body 106, the handle 102, and the umbilical cord to the nozzle 108. The body 106 can include at least one mirror (not shown) or lens (not shown) to focus or change the focal length of the laser.

The nozzle 108 can be configured to fluidically and optically communicate both gas and a laser therethrough. The nozzle 108 can extend from the body 106 of the handheld laser trimming and welding wand 100 to a distal portion 110. The nozzle 108 can be removably coupled to the body 106.

Figure 4:
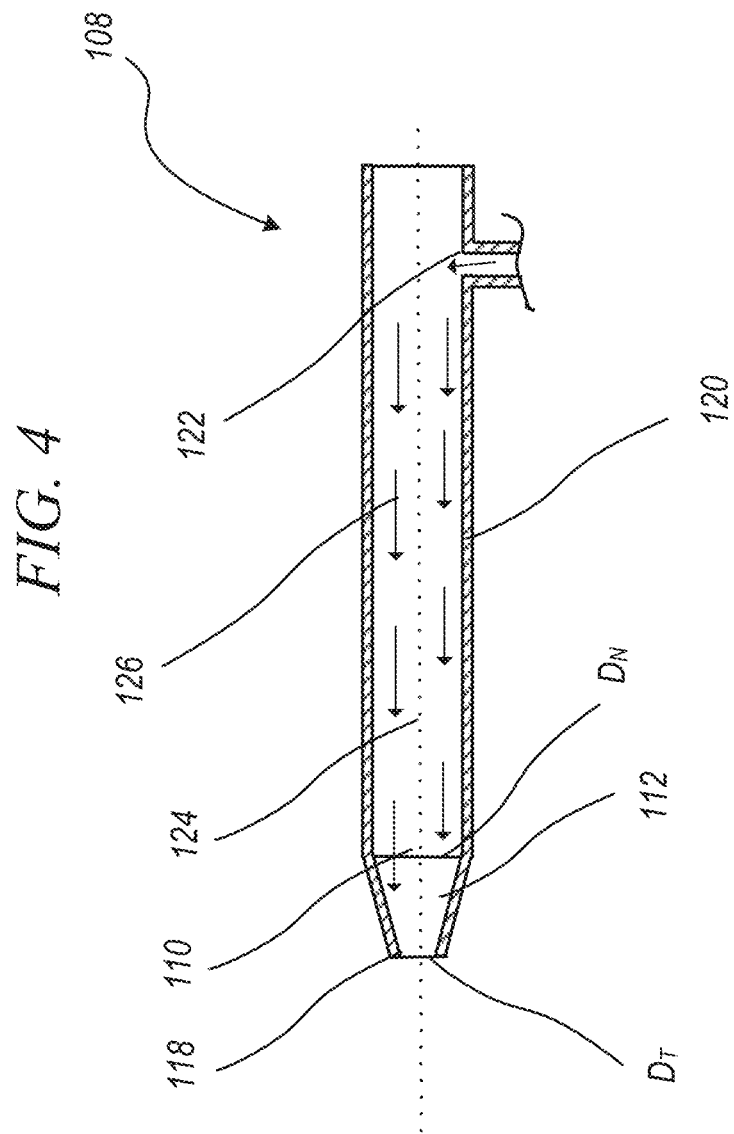
FIG. 4 is a cross-sectional view of a nozzle of a laser welding wand.

FIG. 4 is a cross-sectional view of the nozzle 108. In examples, the nozzle 108 can be a hollow cylinder or a hollow cone. In more examples, the nozzle 108 can be a hollow square, hollow rectangular prism, hollow octagonal prism, or any other shape that can direct a laser and gas therethrough. The distal portion 110 of the nozzle 108 can include a nozzle diameter $D_N$. The nozzle 108 can include a sidewall 120. The sidewall 120 can extend from the body 106 to the distal portion 110 of the nozzle 108. The sidewall 120 can include a second aperture 122. The sidewall 120 and the second aperture 122 can be configured to introduce dry compressed air (e.g., the gas 126) into the nozzle 108. In another example, the sidewall 120 and the second aperture 122 can be configured to introduce oxygen or nitrogen (e.g., the gas 126) into the nozzle 108. The distal portion 110 of the nozzle 108 can be configured to receive a tip 112.

The tip 112 can be configured to focus a laser and accelerate a gas therethrough to aid in the cutting of a working material 20 (FIG. 2). The tip 112 can extend from the distal portion 110 of the nozzle 108. The tip can be a hollow cylinder or a hollow cone. In more examples, the tip 112 can be a hollow square, hollow rectangular prism, hollow octagonal prism, or any other shape that can direct a laser and gas therethrough. The tip 112 can include an aperture 118. The tip 112 can include a tip diameter $D_T$ defined at the aperture 118. As shown in FIG. 4, the tip diameter $D_T$ can be less than the nozzle diameter $D_N$. Thus, the tip 112 can accelerate the gas 126 leaving the distal portion 110 of nozzle 108 and out the aperture 118 because of the decreased cross-sectional area the gas 126 can flow therethrough. In one example, the tip 112 can be made from copper. In another example, the tip 112 can be made from tin, titanium, steel, or alloys thereof or any other material with high thermal and electrical conductivity.

The gas 126 can be configured to assist the handheld laser trimming and welding wand 100 in cutting the working piece 20 (FIG. 2). In one example, the gas 126 can be dry compressed air. In another example, the gas 126 can be oxygen, nitrogen, argon, or any other gas that can be used with a handheld laser welder. The gas 126 accelerates as it passes through the tip 112, thus the gas 126 leaving the tip 112 can apply a cutting pressure upon the working piece 20. Moreover, the gas 126 can have an exothermic reaction with the laser 124. In combination, the pressure and the exothermic reaction of the gas 126 help the handheld laser trimming and welding wand 100 trim the working piece 20.

The gas 126 can be different than the gas supplied into the nozzle 108 from the control unit. In another example, the gas 126 can be the same kind of the gas provided from the control unit, and the gas 126 added through the second aperture 122 can increase the concentration of gas within the distal portion 110 and the tip 112.

Figure 5:
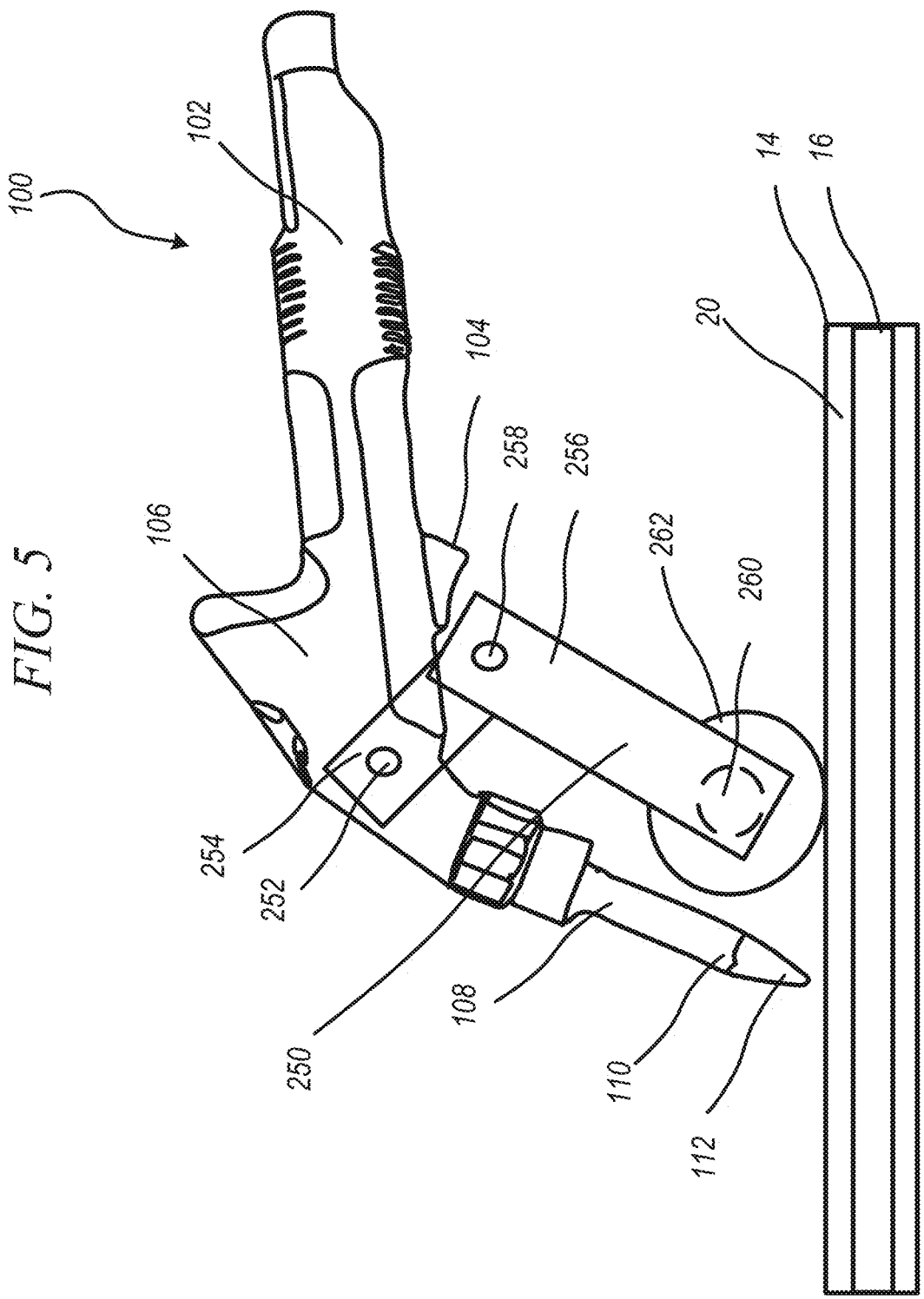
FIG. 5 is a perspective view of a laser welding wand with a pressure wheel assembly.

FIG. 5 is a perspective view of the handheld laser trimming and welding wand 100 with a pressure wheel assembly 250 attached. The pressure wheel assembly 250 can be configured to transfer a pressure applied to the handheld laser trimming and welding wand 100 by the operator to the working piece 20 while trimming and welding the working piece 20. The pressure wheel assembly 250 may supply pressure to flatten the corrugation of a first layer (e.g., the first layer 14) and a second layer (e.g., the second layer 16) and improve a surface area of contact between the first layer and the second layer. The pressure wheel assembly 250 can include an attachment mechanism 252, a main support arm 254, a first pressure wheel support arm 256, a connection mechanism 258, and a pressure wheel axle 260.

The attachment mechanism 252 can be configured to attach the pressure wheel assembly 250 to the handheld laser trimming and welding wand 100. The attachment mechanism 252 can be a removable fastener (e.g., a bolt and a nut, a strap and a latch, a collar, or any other removable fastener that can attach an accessory to the handheld laser trimming and welding wand 100). Alternatively, the attachment mechanism 252 can be a permanent fastener (e.g., a rivet, a spot weld, or any other permanent fastener that can attach an accessory to the handheld laser trimming and welding wand 100). In the example shown in FIG. 5, the attachment mechanism 252 can be configured to attach the pressure wheel assembly 250 to the body 106 of the handheld laser trimming and welding wand 100. In another example, the attachment mechanism 252 can be configured to attach the pressure wheel assembly 250 to the handle 102 of the handheld laser trimming and welding wand 100. In yet another example, the attachment mechanism 252 can be configured to attach the pressure wheel assembly 250 to the nozzle 108 of the handheld laser trimming and welding wand 100. In this example, the attachment mechanism 252 can be attached to a welding nozzle, and the pressure wheel assembly 250 can be installed on the welding wand 100 when the welding nozzle is being attached to the body 106 of the handheld laser trimming and welding wand 100.

The main support arm 254 can be attached to the attachment mechanism 252 and can extend away from the handheld laser trimming and welding wand 100. The connection mechanism 258 can connect the main support arm 254 and the first pressure wheel support arm 256. The connection mechanism 258 can be either a removable fastener or a permanent fastener. Further, the connection mechanism 258 can permit or block rotation of the first pressure wheel support arm 256 with relation to the main support arm 254. In one or more examples, the main support arm 254 and the first pressure wheel support arm 256 can be integral or unitary components and not separate connected components.

The pressure wheel axle 260 can be attached to the first pressure wheel support arm 256 and can extend under the handheld laser trimming and welding wand 100. In one example, the first pressure wheel support arm 256 and the pressure wheel axle 260 can be two separate components. In another example, the first pressure wheel support arm 256 and the pressure wheel axle 260 can be one monolithic component, such as where a spindle extends laterally from the first pressure wheel support arm 256, for example. In yet another example, the attachment mechanism 252, the main support arm 254, the first pressure wheel support arm 256, the connection mechanism 258, and the pressure wheel axle 260 can be one monolithic, integral, and/or unitary component.

A pressure wheel 262 can be configured to fit on the pressure wheel axle 260. The pressure wheel 262 can rotate around the pressure wheel axle 260 while the handheld laser trimming and welding wand 100 moves across the working piece 20. That is, for example, the pressure wheel 262 may rotate freely on the pressure wheel axle 260 such as by being mounted to the pressure wheel axle 260 with a bearing or other low friction mounting system. The attachment mechanism 252, the main support arm 254, the first pressure wheel support arm 256, the connection mechanism 258, the pressure wheel axle 260, and the pressure wheel 262 can transfer a pressure applied to the handle 102 of the handheld laser trimming and welding wand 100 to the working piece 20. The pressure transferred to the working piece 20 can help hold the first layer 14 and the second layer 16 in position while trimming and welding the working piece 20 to form the heat shield 12.

Figure 6:
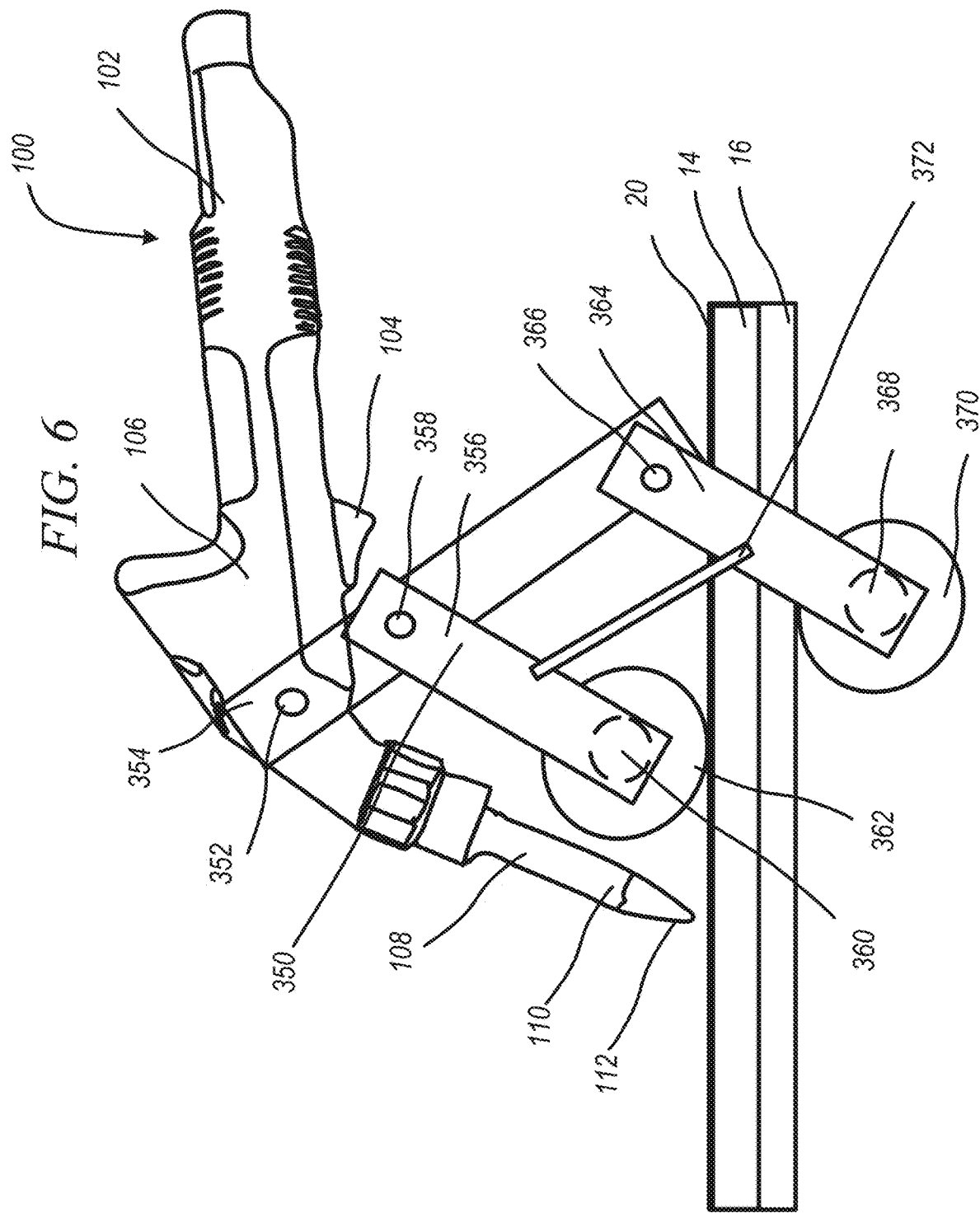
FIG. 6 is a perspective view of a laser welding wand with a pressure wheel assembly.

FIG. 6 is a perspective view of the handheld laser trimming and welding wand 100 with a pressure wheel assembly 350 attached. The pressure wheel assembly 350 can be configured to enable the operator to apply pressure to the working piece 20 and hold the first layer 14 and the second layer 16 together while trimming and welding the working piece 20 with the handheld laser trimming and welding wand 100. The pressure wheel assembly 350 can include an attachment mechanism 352, a main support arm 354, a first pressure wheel support arm 356, a connection mechanism 358, a pressure wheel axle 360, a first pressure wheel 362, a second pressure wheel support arm 364, a second connection mechanism 366, a second pressure wheel axle 368, a second pressure wheel 370, and a tension arm 372.

The attachment mechanism 352 can be a removable fastener (e.g., a bolt and a nut, a strap and a latch, a collar, or any other removable fastener that can attach an accessory to the handheld laser trimming and welding wand 100). Alternatively, the attachment mechanism 352 can be a permanent fastener (e.g., a rivet, a spot weld, or any other permanent fastener that can attach an accessory to the handheld laser trimming and welding wand 100). In the example shown in FIG. 6, the attachment mechanism 352 can be configured to attach the pressure wheel assembly 350 to the body 106 of the handheld laser trimming and welding wand 100. In another example, the attachment mechanism 352 can be configured to attach the pressure wheel assembly 350 to the handle 102 of the handheld laser trimming and welding wand 100. In yet another example, the attachment mechanism 352 can be configured to attach the pressure wheel assembly 350 to the nozzle 108 of the handheld laser trimming and welding wand 100. In this example, the attachment mechanism 352 can be attached to a welding nozzle, and the pressure wheel assembly 350 can be installed on the welding wand 100 when the welding nozzle is being attached to the body 106 of the handheld laser trimming and welding wand 100.

The main support arm 354 can be attached to the attachment mechanism 352 and can extend away from the handheld laser trimming and welding wand 100. The connection mechanism 358 can attach the main support arm 354 and the first pressure wheel support arm 356. The connection mechanism 358 can be either a removable fastener or a permanent fastener. Further, the connection mechanism 358 can permit or block rotation of the first pressure wheel support arm 356 with relation to the main support arm 354. In one or more examples, the main support arm 354 and the first pressure wheel support arm 356 can be integral or unitary components and not separate connected components.

The pressure wheel axle 360 can extend from the main support arm 354 in a direction that is under the handheld laser trimming and welding wand 100. In one example, the first pressure wheel support arm 356 and the pressure wheel axle 360 can be two separate components. In another example, the first pressure wheel support arm 356 and the pressure wheel axle 360 can be one monolithic integral, and/or unitary component.

The first pressure wheel 362 can be configured to fit on the pressure wheel axle 360. The first pressure wheel 362 can rotate around the pressure wheel axle 360 while the handheld laser trimming and welding wand 100 moves across the working piece 20. That is, for example, the pressure wheel 262 may rotate freely on the pressure wheel axle 260 such as by being mounted to the pressure wheel axle 260 with a bearing or other low friction mounting system. The attachment mechanism 352, the main support arm 354, the first pressure wheel support arm 356, the connection mechanism 358, the pressure wheel axle 360, and the first pressure wheel 362 can transfer a pressure applied to the handle 102 of the handheld laser trimming and welding wand 100 to the working piece 20. The pressure transferred to the working piece 20 can help hold the first layer 14 and the second layer 16 in position while trimming and welding the working piece 20 to form the heat shield 12.

The second connection mechanism 366 can attach the second pressure wheel support arm 364 to the main support arm 354. The second connection mechanism 366 can be either a removable fastener or a permanent fastener. Further, the second connection mechanism 366 can permit or block rotation of the second pressure wheel support arm 364 in relation to the main support arm 354.

The second pressure wheel axle 368 can be attached to the second pressure wheel support arm 364 in a direction that is under the handheld laser trimming and welding wand 100. The second pressure wheel axle 368 can be spaced apart from the pressure wheel axle 360 to allow the working piece 20 to fit therebetween. Thus, the main support arm 354, the first pressure wheel support arm 356, and the second pressure wheel support arm 364 are U-shaped so that the first pressure wheel support arm 356 can support the first pressure wheel 362 while contacting the first layer 14 and the second pressure wheel support arm 364 can support the second pressure wheel 370 while contacting the second layer 16 of the working piece 20.

The second pressure wheel 370 can be configured to fit on the second pressure wheel axle 368. The second pressure wheel 370 can rotate around the second pressure wheel axle 368 while the handheld laser trimming and welding wand 100 moves across the working piece 20. As discussed above, the pressure wheel axle 360 and the second pressure wheel axle 368 can be configured to fit the working piece 20 therebetween. Thus, the first pressure wheel 362 and the second pressure wheel 370 can work together to hold the first layer 14 and the second layer 16 of the working piece 20 while the handheld laser trimming and welding wand 100 trims and welds the working piece 20 to create the heat shield 12. The pressure transferred to the working piece 20 can help hold the first layer 14 and the second layer 16 in position while trimming and welding the working piece 20 to form the heat shield 12.

The tension arm 372 can be attached to the first pressure wheel support arm 356 and the second pressure wheel support arm 364. The tension arm 372 can be configured to maintain tension between the first pressure wheel support arm 356 and the second pressure wheel support arm 364. The tension arm can be a solid linkage (e.g., a rod, a bar, or a post), an adjustable linkage (e.g., a spring or a screw), or any other linkage that can be used to add tension to the first pressure wheel support arm 356 and the second pressure wheel support arm 364.

INDUSTRIAL APPLICABILITY

In one or more operating examples of the device discussed in this disclosure, FIG. 7 shows a flowchart of a method of trimming a workpiece with the handheld laser trimming and welding device of FIGS. 3 and 4 (e.g., welding wand 100). The handheld laser trimming and welding device can be prepared for trimming a working piece (e.g., working piece 20) with steps 700 and 702. At step 700, preparing the handheld laser trimming and welding device for trimming by installing a cutting nozzle (e.g., the nozzle 108) on the handheld laser trimming and welding device. At step 702, the handheld laser trimming and welding device is prepared for trimming by turning on an assisting gas (e.g., the gas 126). As discussed above, the assisting gas both applies a cutting pressure on the working piece (e.g., working piece 20) and can have an exothermic reaction with a laser (e.g., laser 124) to help with cutting the working piece.

The method of trimming with the handheld laser trimming and welding device can be shown in step 704. At step 704, a device operator can use the handheld laser trimming and welding device to trim the working material by pulling the trigger (e.g., the trigger 104) while the tip (e.g., the tip 112) is in contact with the working piece and moving the handheld laser trimming and welding device across the working piece, allowing the laser and assisting gas to cut the working piece.

In one or more operating examples of the device discussed in this disclosure, FIG. 8 shows a flowchart of a method of welding a working piece with the handheld laser trimming and welding device shown in FIGS. 5 and 6. The handheld laser trimming and welding device can be prepared for welding a working piece by implementing steps 800 and 802.

At step 800, the handheld laser trimming and welding device can be prepared for welding by removing the cutting nozzle (e.g., the nozzle 108) from the handheld laser trimming and welding device, and installing a welding nozzle. The welding nozzle can be a standard welding nozzle that does not include accommodations for assisting gas or a tip with an aperture as small as the aperture 118 of the tip 112.

At step 802, the handheld laser trimming and welding device can be prepared for welding a workpiece by installing the pressure wheel assembly (e.g., pressure wheel assembly 250 or pressure wheel assembly 350) by attaching an attachment mechanism (e.g., attachment mechanism 252 or attachment mechanism 352) to the handheld laser trimming and welding device. As discussed above, in one or more examples, the pressure wheel assembly can be attached to the welding nozzle and their installation on the handheld laser trimming and cutting wand can be simultaneous.

The handheld laser trimming and welding device can be used for welding the working piece by following steps 804 and 806. At step 804, the handheld laser trimming and welding device can be turned on by pulling the trigger (e.g., the trigger 104) while the tip of the welding nozzle is in contact with the working piece to weld a first layer (e.g., first layer 16) and a second layer (e.g., the second layer 18). At step 806, the quality of the weld between the first layer and the second layer can be made more consistent by applying pressure to the working piece while welding to hold the first layer and the second layer together while welding by pressing the handheld laser trimming and welding device toward the workpiece so that a pressure wheel (e.g., pressure wheel 262, or first pressure wheel 362 and second pressure wheel 370) contact the working piece layer(s) to hold the first layer and the second layer together to improve the consistency of welding the layers together.

In one or more operating examples of the device discussed in this disclosure, FIG. 9 shows a flowchart of a method of trimming and welding a workpiece with the handheld laser trimming and welding device. The handheld laser trimming and welding device can be prepared to trim and weld the working piece by following steps. At step 900, the handheld laser trimming and welding device can be prepared to trim the working piece by installing a cutting nozzle (e.g., the nozzle 108) on the handheld laser trimming and welding device and turning on an assisting gas (e.g., the gas 126).

The handheld laser trimming and welding device can be prepared to weld the working piece by following step 902. At step 902, the handheld laser trimming and welding device can be prepared to weld the working piece by installing the pressure wheel assembly (e.g., pressure wheel assembly 250 or pressure wheel assembly 350) by attaching an attachment mechanism (e.g., attachment mechanism 252 or attachment mechanism 352) to handheld laser trimming and welding device. As discussed above, in one or more examples, the pressure wheel assembly can be attached to the nozzle and their installation on the handheld laser trimming and cutting wand can be simultaneous.

The handheld laser trimming and welding device can be used to trim and weld the working piece by following steps 904 and 906. At step 904, the handheld laser trimming and welding device can trim and simultaneously welding the working piece by pulling the trigger (e.g., the trigger 104) while the tip of the welding nozzle is in contact with the working piece to cut and weld the first layer (e.g., first layer 16) and the second layer (e.g., the second layer 18).

At step 906, the quality of the welding made by the handheld laser trimming and welding device can be improved by applying a pressure to the working piece while trimming and welding to hold the first layer and the second layer together while trimming and welding by pressing the handheld laser trimming and welding device toward the workpiece so that a pressure wheel (e.g., the pressure wheel 262, or the first pressure wheel 362 and the second pressure wheel 370) contact the working piece layer(s) (e.g., first layer 16 and second layer 18) to hold the first layer and the second layer together while the handheld laser trimming and welding device simultaneously trims and welds the working piece.

The above-detailed description is intended to be illustrative and not restrictive. The scope of the disclosure should, therefore, be determined with references to the appended claims, along with the full scope of equivalents to which such claims are entitled.

What is claimed is:

1. A handheld laser trimming and welding device comprising:

a laser welding wand;

a nozzle extending from the laser welding wand to a distal portion, the nozzle having an aperture on the distal portion, the nozzle configured to optically communicate a laser to the distal portion of the nozzle and fluidically communicate a pressurized gas to the distal portion of the nozzle; and a pressure wheel assembly attached to the laser welding wand, the pressure wheel assembly configured to apply pressure to a working sheet while the handheld laser trimming and welding device welds the working sheet, the pressure wheel assembly including:

an attachment mechanism configured to attach the pressure wheel assembly to the laser welding wand;

a main support beam extending from the attachment mechanism;

a first pressure wheel support arm, extending from the main support beam;

a second pressure wheel support arm extending from the main support beam such that the main support beam, the first pressure wheel support arm, and the second pressure wheel support arm are U-shaped so that the first pressure wheel support arm positions a first pressure wheel to contact a first sheet of material and the second pressure wheel support arm positions a second pressure wheel to contact a second sheet of material; and a tension mechanism connected to the first pressure wheel support arm and the second pressure wheel support arm, the tension mechanism configured to apply tension to the first pressure wheel support arm and the second pressure wheel support arm to hold the first sheet of material and the second sheet of material between the first pressure wheel and the second pressure wheel.

2. The handheld laser trimming and welding device of claim 1, further comprising:

a tip attached to the distal portion of the nozzle, the tip is configured to optically communicate a laser and fluidically communicate a pressurized gas therethrough.

3. The handheld laser trimming and welding device of claim 2, wherein the tip further comprises:

an aperture with a diameter smaller than a diameter of the aperture on the distal portion of the nozzle.

4. The handheld laser trimming and welding device of claim 3, wherein the tip is copper.

5. The handheld laser trimming and welding device of claim 1, wherein the nozzle further comprises:

a sidewall extending from the laser welding wand to the distal portion, the sidewall having an aperture configured to introduce the pressurized gas to the nozzle.

6. The handheld laser trimming and welding device of claim 5, wherein the pressurized gas is dry compressed air.

7. The handheld laser trimming and welding device of claim 5, wherein the pressurized gas is oxygen.

8. The handheld laser trimming and welding device of claim 1, wherein the pressure wheel assembly further comprises:

a main support extending from the attachment mechanism;

a first pressure wheel support arm, extending from the main support; and a pressure wheel axle attached to the first pressure wheel support arm, the pressure wheel axle configured to hold a pressure wheel such that the pressure wheel contacts a first sheet of material.

9. A handheld laser trimming and welding device comprising:

a laser welding wand;

a nozzle extending from the laser welding wand to a distal portion, the nozzle having an aperture on the distal portion, the distal portion of the nozzle configured optically communicate a laser to the distal portion of the nozzle and fluidically communicate a pressurized gas to the distal portion of the nozzle; and a pressure wheel assembly attached to the laser welding wand, the pressure wheel assembly configured to apply pressure to a working sheet while the handheld laser trimming and welding device welds the working sheet, the pressure wheel assembly including:

an attachment mechanism configured to attach the pressure wheel assembly to the laser welding wand;

a main support beam extending from the attachment mechanism;

a first pressure wheel support arm. extending from the main support beam; and a second pressure wheel support arm extending from the main support beam such that the main support beam, the first pressure wheel support arm, and the second pressure wheel support arm are U-shaped so that the first pressure wheel support arm engages a first pressure wheel on a first sheet of material and the second pressure wheel support arm engages a second pressure wheel on a second sheet of material.

10. The handheld laser trimming and welding device of claim 9, further comprising:

a tip attached to the distal portion of the nozzle, the tip is configured to optically communicate a laser and fluidically communicate a pressurized gas therethrough.

11. The handheld laser trimming and welding device of claim 10, wherein the tip further comprises:

an aperture with a diameter smaller than a diameter of the aperture on the distal portion of the nozzle.

12. The handheld laser trimming and welding device of claim 11, wherein the tip is copper.

13. The handheld laser trimming and welding device of claim 9, wherein the nozzle further comprises:

a sidewall extending from the laser welding wand to the distal portion, the sidewall baving an aperture configured to introduce the pressurized gas to the nozzle.

14. The handheld laser trimming and welding device of claim 13, wherein the pressurized gas is dry compressed air.

15. The handheld laser trimming and welding device of claim 9, the pressure wheel assembly further comprises:

a main support extending from the attachment mechanism;

a first pressure wheel support arm, extending from the main support; and a pressure wheel axle attached to the first pressure wheel support arm, the pressure wheel axle configured to hold a pressure wheel such that the pressure wheel contacts a first sheet of material.

* * * * *